3,194,837
N-ARYLALKYL-PHENYLALKYL AMINES
Ingeborg Hennig, Kelkheim, Taunus, and Ernst Lindner, Frankfurt am Main, Germany, assignors to Farbwerke Hoechst Aktiengesellschaft vormals Meister Lucius & Brüning, Frankfurt am Main, Germany, a corporation of Germany
No Drawing. Filed Nov. 9, 1961, Ser. No. 151,159
Claims priority, application Germany, Nov. 12, 1960, F 32,535
5 Claims. (Cl. 260—570.8)

The present invention relates to phenylalkylamines corresponding to the general Formula I

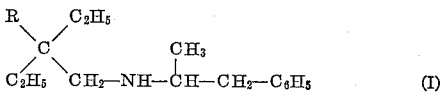
(I)

as well as to pharmaceutical preparation, particularly for parenteral application and containing the aforementioned compounds as active ingredients.

The present invention likewise relates to a process for preparing the above-mentioned compounds by synthesizing them in the usual manner, for instance by (a) Reducing a phenyl-acetone in the presence of amines corresponding to the general Formula II

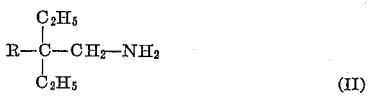
(II)

in which R has the meaning given above, or by reacting a phenyl-acetone with amines of the Formula II, and subsequently reducing the condensation product, or by (b) Reacting amines of the Formula II with 1-phenyl-2-halogen-propanes or 1-phenyl-2-halogen-propenes, if desired in the presence of agents binding hydrogen halides, and by hydrogenating, if desired, a double bond that may exist in the reaction products thus obtained, or by (c) Reacting halogenated hydrocarbons corresponding to the general Formula III

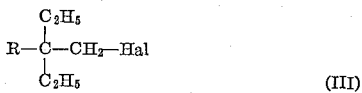
(III)

in which Hal stands for a halogen atom and R has the meaning given above, with 1-phenyl-2-amino-propane, if desired in the presence of agents binding hydrogen halides, or by (d) Reducing aldehydes corresponding to the general Formula IV

(IV)

in which R has the meaning given above, in the presence of 1-phenyl-2-amino-propane or reacting them with 1-phenyl-2-amino-propane and then reducing the condensation product, or by (e) Reducing carboxylic acid amides corresponding to the Formula V

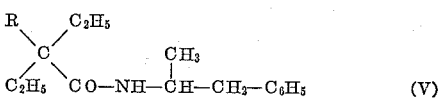
(V)

in which R has the meaning given above in order to obtain the corresponding amines and, if desired, by converting the basic compounds obtained into the corresponding salts by means of inorganic or organic acids.

The new products are valuable medicaments showing, in particular, a favorable action on cardiac and blood vascular circulation and being superior to the already known products of similar structure as regards therapeutic action.

For preparing the new products it is of special advantage to carry out the reduction of phenyl-acetone in the presence of amines of the Formula II. As amines may be used, for example, 1-phenyl-2,2-diethyl-3-amino-propane; 2-ethyl-2-phenyl-1-amino-butane; 2-ethyl-2-(o,m,p)-methoxyphenyl-1-amino-butane; 2-ethyl-2-(o.m.p) - tolyl-1-amino-butane; 2-ethyl-2-(o,m,p)-ethylphenyl-1 - amino-butane; and 2-ethyl-2-(o,m,p)-ethoxyphenyl-1-amino-butane.

The above-mentioned 2-ethyl-1-amino-butane derivatives are obtained by ethylation of benzyl-cyanide that may be substituted, and by subsequent hydrogenation. 1-phenyl-2,2-diethyl-3-amino-propane is prepared from diethyl-acetonitrile and benzyl-chloride with following hydrogenation of the nitrile group.

The reduction of phenyl-acetone in the presence of the amines is favorably effected catalytically. As catalysts, there are suitably used metals of the 8th Group of the Periodic System, preferably precious metals such as palladium or platinum. It is favorable to operate in the presence of the usual solvents, for instance aqueous alcohols or water. Nickel catalysts, preferably Raney nickel catalysts, can likewise be used. The reduction can also be carried out by means of sodium boron hydride, it being of advantage primarily to prepare the condensation product of amine and phenylacetone, if desired at a moderately elevated temperature and with the use of a suitable inert organic solvent, such as benzene or toluene, and to reduce the reaction product after dilution with an appropriate solvent, for instance a low-molecular alcohol, if desired in the presence of water, by adding sodium boron hydride in several portions. It is likewise possible to carry out the reduction by means of nascent hydrogen, for instance with aluminum amalgam and alcohol, sodium amalgam or lithium-aluminum hydride. It can likewise be carried out electrolytically.

According to another favorable method of realizing the process of the invention the above-mentioned amines of the Formula II may be reacted with 1-phenyl-2-halogen-propanes or 1-phenyl-2-halogen-propenes. As such 1-phenyl-2-halogen-propanes or 1-phenyl-2-halogen-propenes there are mentioned: 1-phenyl-2-chloro-propane, 1-phenyl-2-bromo-propane or 1-phenyl-2-iodo-propane as well as the corresponding 1-phenyl-2-halogeno-propenes. The halogeno-propanes are prepared by halogenation of methyl-benzyl-carbinol.

This reaction is suitably effected by prolonged heating in appropriate solvents, for instance in aromatic hydrocarbons such as benzene or toluene; in order to bind the hydrogen halide set free it is of advantage to react 1 mol of 1-phenyl-2-halogeno-propane or of 1-phenyl-2-halogeno-propene with 2 mols of the amine. The halogen halide can, however, likewise be bound by the usual basic agents, for instance alkali metal carbonates and alkaline earth metal carbonates or alkali metal hydroxides or alkaline earth metal hydroxides, as well as organic bases such as pyridine or quinoline which may simultaneously be used as solvent. In said case an excess of amine can be dispensed with. The further treatment is carried out in the usual manner by separating the salt of the hydrogen halide of the base used, for instance, by precipitation with ether or shaking with water. The basic product obtained according to the process of the invention can be purified by distillation or conversion into an appropriate salt. If propene halides are used, the double linkage is subsequently hydrogenated according to the usual known methods.

The conversion of amines with halogen halides can be effected in the same manner, if halogenated hydrocarbons corresponding to the above-mentioned Formula III are used and these are reacted in the above-described manner with 1-phenyl-2-amino-propane. As such halogenated hydrocarbons there are used the compounds corresponding to the amines of the Formula II containing instead of the amino group a halogen atom. As starting substance be mentioned the 2-ethyl-2-phenyl-1-chloro-butane. The halogeno-butane derivatives can be prepared as follows:

Diethyl-phenyl-acetate can be reduced by means of lithium-aluminum hydride or sodium/alcohol to the 2-ethyl-2-phenyl-butanol-(1). From this alcohol there can be obtained the corresponding bromide in the usual manner, for instance, by means of phosphorus-tribromide.

Another method of carrying out the process according to the invention consists in that aldehydes of the Formula IV are reduced in the presence of 1-phenyl-2-amino-propane. As aldehydes there can be used: Phenyl-diethyl-acetaldehyde, α,α-diethyl-β - phenyl - propionaldehyde, m-(o,p)-methoxyphenyl - diethyl - acetaldehyde, m-(o,p)-tolyl - diethyl - acetaldehyde and m - (o,p) - ethyl-phenyl-diethyl-acetaldehyde. The substituted acetaldehydes can be obtained, for instance, by rearrangement of α,α-diethyl-α'-phenyl-ethylene-glycol by means of dilute acids.

The aldehydes are preferably reacted by hydrogenation in the presence of 1-phenyl-2-amino-propane. The reduction is suitably carried out catalytically by the aid of metals of the 8th Group of the Periodic System, preferably precious metals such as palladium or platinum, in the presence of the usual solvents, for example aqueous alcohols, alcohols or water. Raney nickel catalysts may likewise be used. The reduction can likewise be carried out by means of nascent hydrogen, for instance, aluminum amalgam and alcohol, sodium amalgam, lithium-aluminum hydride or with sodium boron hydride. It can also be effected electrolytically. In some cases it may be of advantage to isolate at first the condensation product obtained from aldehyde and 1-phenyl-2-amino-propane and to carry out the reduction only afterwards. The condensation taking place in the first stage generally proceeds already at room temperature or at a moderately elevated temperature (steam bath). It is suitably effected in the presence of an inert organic solvent such as benzene or toluene. For the reduction one of the above-mentioned solvents is suitably used and the operation is continued as described above, for instance, by adding sodium boron hydride in several portions.

According to another method of carrying out the process of the invention it is likewise possible to reduce carboxylic acid amides corresponding to the general Formula V

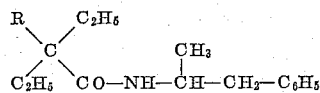

according to known methods, the reduction by means of lithium-aluminum hydride being extraordinarily favorable. The carboxylic acid amides used as starting substances can be prepared, for instance, by reacting acid chlorides of the general formula

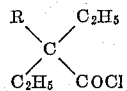

in which R has the meaning given above, with 1-phenyl-2-amino-propane. As acid chlorides there enter into consideration, for instance: Phenyl-diethyl-acetyl-chloride, α,α-diethyl-β-phenyl-propionyl-chloride, diethyl-(p-tolyl)-acetyl-chloride, diethyl-(p-tolyl)-acetyl - chloride, diethyl-(p-methoxy-phenyl)-acetyl-chloride. The corresponding acids can be obtained by hydrolysis from phenyl-diethyl-aceto-nitrile, that may be substituted or from benzyl-diethyl-acetonitrile. The amide that is at first formed can be converted into benzyl- or phenyl-diethyl-acetic acid by means of nitrous acid. The acid chloride is prepared as usually, for instance by means of thionyl-chloride.

The carboxylic acid amides are reduced by means of lithium-aluminum-hydride according to known methods, suitably in the presence of inert organic solvents such as ether, dioxane or tetrahydrofurane. It is of advantage to add the amide to the lithium-aluminum-hydride suspension in one of the above-mentioned solvents, to let the reaction mixture boil for some time under reflux, cautiously to decompose it subsequently by means of water and to recover it in the usual manner by separating the organic from the inorganic parts. Finally, the above-described carboxylic acids can likewise be reduced electrolytically, in order to obtain the amines.

The products obtained according to the process of the present invention and constituting basic compounds can be converted by means of inorganic or organic acids into the corresponding salts. As inorganic acids there are mentioned: Hydrohalic acids such as hydrochloric acid and hydrobromic acid as well as sulfuric acid, phosphoric acid and amido-sulfonic acid.

As organic acids there are mentioned, for example: Formic acid, acetic acid, propionic acid, lactic acid, glycolic acid, gluconic acid, maleic acid, succinic acid, tartaric acid, benzoic acid, salicylic acid, citric acid, aceturic acid, hydroxy-ethane-sulfonic acid and ethylene-diamine-tetracetic acid.

The products of the invention exhibit a very favorable action on cardiac and blood vascular circulation. For example, in the test on the isolated heart of guinea pigs according to the method by Langendorff, a single injection of 10γ of 1-phenyl-2-[1'-phenyl-2',2'-diethyl-propyl-(3')]-amino-propane causes a strong, dilatation of the coronary vessels. The advantage of the new products consists, above all, in that they are less toxic than known compounds of similar structure. For instance, the minimum lethal dose of the above-mentioned product, when intravenously injected, in mice, amounts to 40 milligrams/kilogram. In comparison thereto, the minimum lethal dose of the already known product 1-phenyl-2-[1',1'-diphenyl-propyl-(3')-amino] - propane, intraveously injected in mice, amounts to 15 milligrams/kilogram.

The products obtained according to the process of the invention can be applied orally or parenterally as such or in the form of the corresponding salts, if desired likewise in admixture with pharmaceutically usual carrier substances. When orally administered they are preferably applied in the form of tablets or dragees, to which the products of the invention as active ingredients are worked up with the usual carrier substances such as lactose, starch, tragacanth and magnesium stearate. The active substances are, however, preferably administered in the form of injection solutions containing the usual carrier substances, preferably water. The preferred single dose amounts to 5–30, above all to 10–15 milligrams.

The following examples serve to illustrate the invention but they are not intended to limit it thereto:

*Example 1*

10 grams of 1-phenyl-2,2-diethyl-3-amino-propane are heated with 7 grams of phenyl-acetone for 30 minutes on the steam bath. The calculated amount of water thereby separates. The mixture is diluted with 80 cc. of methanol, and 1 gram of sodium boron hydride is added in several portions. After heating for 1 hour on the steam bath the major part of the solvent is distilled off under reduced pressure. After addition of about 20 cc. of water, an oil separates which is taken up in ether. After drying and elimination of the ether by distillation there remain 14 grams of 1-phenyl-2-[1'-phenyl-2',2'-diethyl-propyl-(3')]-amino-propane in the form of an oily residue. When adding alcoholic hydrochloric acid, there is obtained the crystalline hydrochloride of this base melting at 148–150° C. (from ethanol of 80% strength).

Example 2

When operating as described in Example 1 there are obtained from 17.7 grams of 2-phenyl-2-ethyl-1-aminobutane and 13.4 grams of phenyl-acetone, 23 grams of 1-phenyl-2-[2'-ethyl-2'-phenyl-butyl-(1')]-amino - propane in the form of an oil. When adding dilute hydrochloric acid the hydrochloride of this base precipitates. Melting point 191–192° C. (from ethanol of 70% strength).

Example 3

When operating as described in Example 1 there are obtained from 20.7 grams of 2-phenyl-2-(m-methoxyphenyl)-1-amino-butane and 13.4 grams of phenyl-acetone, 31 grams of 1-phenyl-2-[2'-ethyl-2'-m-methoxyphenyl-butyl-(1')]-amino-propane in the form of an oil. The hydrochloride, obtained by means of dilute hydrochloric acid, melts at 143° C. (from ethanol of 80% strength).

Example 4

When operating as described in Example 1, there are obtained from 4.5 grams of 2-ethyl-2-p-tolyl-1-aminobutane and 3.2 grams of phenyl-acetone, 7.5 grams of 1 - phenyl - 2 - [2' - ethyl - 2' - p - tolyl - butyl - (1')]-amino-propane in the form of an oil. When adding the calculated amount of an alcoholic maleic acid solution the maleate of the base is obtained that melts at 164–165° C. (from ethanol).

Example 5

20 grams of 1-phenyl-2-bromo-propane are boiled for 5 hours under reflux with 42 grams of 2-ethyl-2-m-methoxy-phenyl-1-amino-butane in 150 cc. of xylene. After elimination of the solvent by distillation under reduced pressure, ether is added to the residue and the latter is shaken several times with water. Dilute hydrochloric acid is added to the ether solution, whereupon the 1-phenyl - 2 - [2' - ethyl - 2' - m - methoxyphenylbutyl - (1')]-amino-propane-hydrochloride precipitates in the form of crystals. Melting point 142–143° C. (from ethanol of 80% strength).

Example 6

When operating as described in Example 1, there are obtained from 17.6 grams of diethylphenyl acetaldehyde and 13.5 grams of 1-phenyl-2-amino-propane, 26 grams of 1 - phenyl - 2 - [2' - ethyl - 2' - phenylbutyl - (1')]-amino-propane in the form of an oily liquid. When alcoholic hydrochloric acid is added to the base, the hydrochloride crystallizes. Melting point 191° C. (from ethanol of 70% strength).

Example 7

A solution of 22.5 grams of diethyl-phenyl-acetyl-chloride in 100 cc. of ether is added dropwise, while stirring at 15° C., to a solution of 27 grams of 1-phenyl-2-amino-propane in 50 cc. of ether. After additional stirring of 1 hour about 50 cc. of water are added to the mixture; the two clear layers are separated. The ether solution is shaken with water, dried by means of sodium sulfate and concentrated. The residue is dissolved in about 100 cc. of ether and added dropwise while stirring to a suspension of 5 grams of lithium-aluminum-hydride in 400 cc. of ether. After boiling for 6 hours under reflux the reaction mixture is decomposed by means of a small amount of water, the precipitate is filtered off with suction and washed with ether. The combined ether solutions are dried by means of sodium sulfate and concentrated. Dilute hydrochloric acid is added to the oily residue, whereupon the hydrochloride of the 1-phenyl-2-[2' - ethyl - 2' - phenyl - butyl - (1')] - amino - propane precipitates in the form of crystals. The melting point amounts to 191–192° C. (after recrystallization from alcohol of 70% strength).

We claim:

1. The compounds of the group consisting of (1) phenylalkylamines of the formula

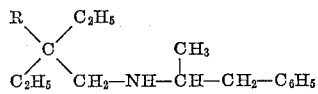

wherein R is a member selected from the group consisting of phenyl, monoalkylphenyl, monoalkoxyphenyl and benzyl, the alkyl and alkoxy substituents having at most 4 carbon atoms and (2) pharmaceutically acceptable acid addition salts thereof.

2. The compound of the formula

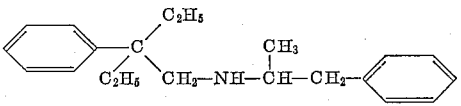

3. The compound of the formula

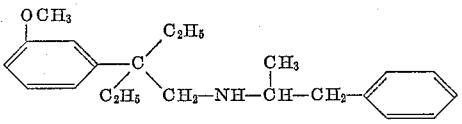

4. The compounds of the formula

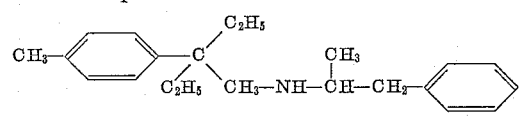

5. The compound of the formula

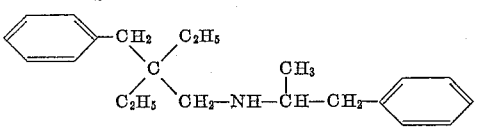

References Cited by the Examiner

UNITED STATES PATENTS

| | | | |
|---|---|---|---|
| 2,276,618 | 3/42 | Kulz | 260—570.8 |
| 2,602,040 | 7/52 | Sanford et al. | 167—65 |
| 2,768,113 | 10/56 | Borsook | 167—65 |
| 2,884,455 | 4/59 | Robertson et al. | 260—570.8 |
| 2,949,359 | 8/60 | Blout et al. | 260—570.8 X |
| 3,050,559 | 8/62 | Burger | 260—570.5 |
| 3,079,403 | 2/63 | Weinstock | 260—570.5 X |
| 3,106,578 | 10/63 | Kaiser et al. | 260—570.5 |

OTHER REFERENCES

Goodman et al.: "Chemical Abstracts," vol. 49, page 6474 (1955).

Huggins: "Chemical Abstracts," vol. 43, pages 7147–8 (1949).

Mndzhoyan et al.: "Chemical Abstracts," vol. 54, page 10910 (1960).

CHARLES B. PARKER, *Primary Examiner*.

LEON ZITVER, *Examiner*.